(12) United States Patent
Ertel et al.

(10) Patent No.: US 9,796,612 B2
(45) Date of Patent: Oct. 24, 2017

(54) METHOD AND SYSTEM FOR TREATING WASTEWATER

(71) Applicant: Eureka Resources LLC, Williamsport, PA (US)

(72) Inventors: Daniel Ertel, Williamsport, PA (US); Kent McManus, Orchard Park, NY (US); Jason Rushing, Alexandria, VA (US); Jerel Bogdan, Cheektowaga, NY (US)

(73) Assignee: Eureka Resources, LLC, Williamsport, PA (US)

( * ) Notice: Subject to any disclaimer, the term of this patent is extended or adjusted under 35 U.S.C. 154(b) by 321 days.

(21) Appl. No.: 13/923,693

(22) Filed: Jun. 21, 2013

(65) Prior Publication Data

US 2013/0341268 A1 Dec. 26, 2013

Related U.S. Application Data

(60) Provisional application No. 61/662,801, filed on Jun. 21, 2012.

(51) Int. Cl.
| | |
|---|---|
| *C02F 3/12* | (2006.01) |
| *C02F 9/00* | (2006.01) |
| *C02F 3/30* | (2006.01) |
| C02F 1/42 | (2006.01) |
| C02F 1/44 | (2006.01) |
| C02F 1/66 | (2006.01) |

(52) U.S. Cl.
CPC .............. *C02F 3/305* (2013.01); *C02F 9/00* (2013.01); *C02F 1/42* (2013.01); *C02F 1/441* (2013.01); *C02F 1/66* (2013.01); *C02F 3/1268* (2013.01); *C02F 3/302* (2013.01); *C02F 2209/08* (2013.01); *C02F 2209/40* (2013.01); *C02F 2305/06* (2013.01); *Y02W 10/15* (2015.05)

(58) Field of Classification Search
CPC ...... C02F 3/1268; C02F 3/302; C02F 3/1273; C02F 2101/16; C02F 2209/02; C02F 3/30; B01D 2311/04; B01D 61/16
USPC ..... 210/605, 621, 623, 630, 195.1, 620, 903
See application file for complete search history.

(56) References Cited

U.S. PATENT DOCUMENTS

| | | |
|---|---|---|
| 4,444,675 A | 4/1984 | Goeldner |
| 4,563,283 A | 1/1986 | Nicksic |
| 4,648,333 A | 3/1987 | Mudd et al. |
| 4,895,665 A | 1/1990 | Colelli et al. |
| 5,011,610 A | 4/1991 | Martin et al. |
| 5,266,210 A | 11/1993 | McLaughlin |
| 5,422,012 A | 6/1995 | Adams |
| 5,879,563 A | 3/1999 | Garbutt |
| 6,113,797 A | 9/2000 | Al-Samadi |

(Continued)

*Primary Examiner* — Claire Norris
(74) *Attorney, Agent, or Firm* — Zeller IP Group, PLLC; Kyle M. Zeller

(57) ABSTRACT

Treating distilled water with bacteria and other microorganisms to remove nitrogen compounds from the distilled water. The distilled water may be produced from pretreating and distilling wastewater, such as wastewater from oil and natural gas production. The treatment steps of the distilled water include subjecting the water to microbial action under both anoxic and aerobic conditions and employing a membrane bioreactor to further purify the water. The purified water is still further purified by either reverse osmosis or ion exchange systems.

17 Claims, 10 Drawing Sheets

(56) References Cited

U.S. PATENT DOCUMENTS

| | | |
|---|---|---|
| 6,932,909 B2 | 8/2005 | Rey |
| 7,244,361 B2 | 7/2007 | Dwyer |
| 7,255,793 B2 | 8/2007 | Cort |
| 7,261,820 B2 | 8/2007 | Blakey et al. |
| 7,322,152 B2 | 1/2008 | Hill |
| 7,393,454 B2 | 7/2008 | Basset et al. |
| 7,438,142 B2 | 10/2008 | Butler et al. |
| 7,497,954 B2 | 3/2009 | Ivan et al. |
| 7,520,342 B2 | 4/2009 | Butler et al. |
| 7,527,736 B2 | 5/2009 | Shafer et al. |
| 7,608,190 B1 | 10/2009 | Banerjee et al. |
| 7,681,643 B2 | 3/2010 | Heins |
| 7,815,804 B2 | 10/2010 | Nagghappan |
| 7,824,552 B2 | 11/2010 | Slabaugh et al. |
| 8,535,538 B1 | 9/2013 | Keeling et al. |
| 8,834,726 B2 | 9/2014 | Keister |
| 8,877,690 B2 | 11/2014 | Keister |
| 9,221,697 B2 | 12/2015 | Keister |
| 2005/0131086 A1 | 6/2005 | Kohler et al. |
| 2005/0279500 A1* | 12/2005 | Heins .................. C02F 1/04 |
| | | 166/266 |
| 2006/0138046 A1* | 6/2006 | Stafford ............... C02F 1/441 |
| | | 210/605 |
| 2007/0114174 A1* | 5/2007 | Peeters et al. ............... 210/605 |
| 2008/0041783 A1* | 2/2008 | Barnes ....................... 210/605 |
| 2008/0223783 A1* | 9/2008 | Sutton ....................... 210/621 |
| 2009/0184054 A1 | 7/2009 | Crawford et al. |
| 2009/0261042 A1 | 10/2009 | Semiat et al. |
| 2010/0264080 A1* | 10/2010 | Livingston et al. ......... 210/605 |
| 2010/0282654 A1* | 11/2010 | Hauschild ............ C02F 3/1268 |
| | | 210/151 |
| 2015/0060368 A1 | 3/2015 | Keister |

* cited by examiner

METHOD AND SYSTEM FOR TREATING WASTEWATER

CROSS-REFERENCE TO RELATED APPLICATIONS

This non-provisional patent application claims priority under 35 U.S.C. §119 to U.S. Provisional Patent Application No. 61/662,801, titled "Methods and Systems of Wastewater Treatment," filed Jun. 21, 2012. The complete disclosure of this provisional patent application is hereby fully incorporated herein by reference.

FIELD OF THE INVENTION

The present invention relates to methods and systems for processing wastewater. More specifically, the present invention relates to processing wastewater, such as that generated when recovering oil and natural gas, to produce a de-wasted water product meeting or exceeding beneficial use criteria, such as the required properties of General Permit WMGR123 (Pennsylvania Department of Environmental Protection, 2012).

BACKGROUND OF THE INVENTION

Extracting oil and natural gas from unconventional resources, such as shale gas formations, through the combination of horizontal drilling and hydraulic fracturing has increased at a rapid pace in recent years. The Marcellus Shale and Utica Shale are sedimentary formations that underlie most of Pennsylvania and West Virginia and extend into parts of Virginia, Maryland, New York and Ohio. These shale formations are two of several important gas reserves in the United States and together they are one of the largest natural gas "plays" in the world. A "play" is the geographic area underlain by a gas or oil containing geologic formation.

Development of these gas plays and other unconventional resources presents significant potential for economic development and energy independence, but also presents the potential for environmental impacts on land, water and air. For example, between 20% and 40% of the water used for hydro-fracturing a gas well returns to the surface as flowback, and later as produced water. In addition to fracturing fluids added by drillers, this wastewater picks up other contaminants from deep in the Earth.

In some parts of the United States, gas drilling companies typically dispose of wastewater deep in the ground, by using deep injection wells. However, the geology in some locations, such as in Pennsylvania, does not necessarily allow for deep injections. Although municipal treatment plants previously accepted this wastewater, certain states, such as Pennsylvania, prevent water treatment facilities from processes water that has flowed back after fracturing. This restriction is thought to promote the goal of establishing and maintaining a closed loop process for the recycling and reuse of oil and gas liquid wastes. States other than Pennsylvania also restrict the ability of publicly-owned treatment works to accept oil and gas wastewaters.

Recently, a number of states have passed regulations to treat processed wastewater having specific properties as a non-waste product. For example, General Permit WMGR123 (Pennsylvania Department of Environmental Protection, 2012) identifies specific water quality criteria that, if met, will not require wastewater after it is processed to be treated as waste. The specific criteria of WMGR123 are reproduced below in Table 1.

TABLE I

General Permit WMGR123

| Property | Limits |
|---|---|
| Aluminum | 0.2 mg/L |
| Ammonia | 2 mg/L |
| Arsenic | 10 µg/L |
| Barium | 2 mg/L |
| Benzene | 0.12 µg/L |
| Beryllium | 4 µg/L |
| Boron | 1.6 mg/L |
| Bromide | 0.1 mg/L |
| Butoxyethanol | 0.7 mg/L |
| Cadmium | 0.16 µg/L |
| Chloride | 25 mg/L |
| COD | 15 mg/L |
| Chromium | 10 µg/L |
| Copper | 5 µg/L |
| Ethylene Glycol | 13 µg/L |
| Gross Alpha | 15 pCi/L |
| Gross Beta | 1,000 pCi/L |
| Iron | 0.3 mg/L |
| Lead | 1.3 µg/L |
| Magnesium | 10 mg/L |
| Manganese | 0.2 mg/L |
| MBAS (Surfactants) | 0.5 mg/L |
| Methanol | 3.5 mg/L |
| Molybdenum | 0.21 mg/L |
| Nickel | 30 µg/L |
| Nitrite - Nitrate Nitrogen | 2 mg/L |
| Oil & Grease | ND |
| pH | 6.5-8.5 SU |
| Radium-226 + Radium-228 | 5 pCi/L |
| Selenium | 4.6 µg/L |
| Silver | 1.2 µg/L |
| Sodium | 25 mg/L |
| Strontium | 4.2 mg/L |
| Sulfate | 25 mg/L |
| Toluene | 0.33 mg/L |
| TDS | 500 mg/L |
| TSS | 45 mg/L |
| Uranium | 30 µg/L |
| Zinc | 65 µg/L |

Accordingly, it is important that public health and the environment are protected as unconventional resource extraction and production activities become a more prominent component of the oil and gas sector. To this end, regulations governing the management of such wastewater have been evolving at the state level, resulting in increased waste management costs for the petroleum industry. Moreover, strict treatment target requirements specified in each state for unrestricted-use water are particularly challenging to meet. Aside from the challenges that may be posed by the regulatory levels for certain contaminants, de-wasting water from oil and natural gas production pose other challenges, including but not limited to the similar density of oil, mud and water; large fluctuation in daily flow rate of the wastewater; and high concentrations of emulsified oil.

There is therefore a need in the art for methods and systems and for processing oil and gas wastewater with a goal to reuse the processed water, such as for water used in well fracturing. It would be especially beneficial if such wastewater could be processed to produce de-wasted water, i.e. unrestricted-use water that is not classified as a "residual waste." The production of de-wasted water would allow for less burdensome storage, transportation, and reuse or the potential direct discharge of the water keeping it in the hydrologic cycle.

SUMMARY OF THE INVENTION

The present invention is generally directed to methods and systems for treating wastewater, such as wastewater from producing oil and natural gas and primarily directed to a process that employs bacteria and other treatment processes to reduce the levels of contaminants in the wastewater to below regulatory criteria.

In one aspect of the present invention, a method for treating wastewater is provided. The method includes the steps of 1) seeding a pre-anoxic tank with activated sludge comprising micro-organisms; 2) adding distilled water comprising contaminants including nitrogen compounds to the pre-anoxic tank, wherein the distilled water is produced from treated wastewater; 3) denitrifying the nitrogen compounds in the added distilled water in the pre-anoxic tank, wherein the denitrification is performed by the micro-organisms under anoxic conditions; 4) transferring the water from the pre-anoxic tank to an aeration tank; wherein additional nitrogen compounds in the water are nitrified under aerobic conditions wherein the nitrification is performed by the micro-organisms; 5) transferring the water from the aeration tank to a post-anoxic tank; wherein additional nitrogen compounds in the water are denitrified under anoxic conditions wherein the denitrification is performed by the micro-organisms; and 6) transferring the water from the post-anoxic tank to a membrane bioreactor comprising a membrane to remove a portion of the contaminants and micro-organisms from the water to arrive at a purified water from the membrane bioreactor.

In another aspect of the present invention, a system for treating wastewater is provided. The system includes a pre-anoxic tank in fluid communication with a distilled water source and operable to receive distilled water from the distilled water source, where the distilled water is produced from treated wastewater and further wherein the pre-anoxic tank includes activated sludge comprising micro-organisms; an aeration tank in fluid communication with the pre-anoxic tank and operable to receive water treated in the pre-anoxic tank; a post-anoxic tank in fluid communication with the aeration tank and operable to receive water treated in the aeration tank; and a membrane bioreactor including a membrane, in fluid communication with the post-anoxic tank and operable to receive water treated in the post-anoxic tank, where the distilled water includes contaminants such as nitrogen compounds and the nitrogen compounds are denitrified in the pre-anoxic tank and post-anoxic tank and nitrified in the aeration tank; and where the membrane removes a portion of the contaminants and micro-organisms from the water to arrive at a purified water from the membrane bioreactor.

In yet another aspect of the present invention a method for treating wastewater is provided. The method includes the steps of: 1) seeding a pre-anoxic tank with activated sludge comprising micro-organisms; 2) controlling the temperature of distilled water comprising contaminants including nitrogen compounds to a range of between 20° C. to 35° C., wherein the distilled water is produced from treated wastewater; 3) filtering the distilled water to remove a portion of the contaminants; 4) adding the filtered distilled water to the pre-anoxic tank; 5) denitrifying the nitrogen compounds in the added distilled water in the pre-anoxic tank, wherein the denitrification is performed by the micro-organisms under anoxic conditions; 6) transferring the water from the pre-anoxic tank to an aeration tank; wherein additional nitrogen compounds in the water are nitrified under aerobic conditions wherein the nitrification is performed by the micro-organisms; 7) transferring the water from the aeration tank to a post-anoxic tank; wherein additional nitrogen compounds in the water are denitrified under anoxic conditions wherein the denitrification is performed by the micro-organisms; 8) transferring the water from the post-anoxic tank to a membrane bioreactor comprising a membrane to remove a portion of the contaminants and micro-organisms from the water to arrive at a purified water from the membrane bioreactor; and 9) further processing the purified water to satisfy a regulatory criterion.

DETAILED DESCRIPTION OF THE EXEMPLARY EMBODIMENTS

The present invention provides methods and systems for producing "de-wasted" water from oil and gas liquid wastewater. "De-wasted" water is water with concentrations of contaminants below regulatory-established criteria for the contaminants, such as the criteria of General Permit WMGR123 (Pennsylvania Department of Environmental Protection, 2012), provided in Table 1 above. The systems and processes described herein may be employed to process wastewater containing contaminants, such as but not limited to, high total suspended solids (TSS), ammonia, nitrates/nitrites, chemical additives, high total dissolved solids (TDS), metals, and/or naturally occurring radioactive materials (NORM). For example, the treatment methods may be employed to treat nearly any type of oil and gas wastewater, including but not limited to top-hole wastewater, pit wastewater, spent drilling fluids, flowback from hydraulic fracturing, and produced wastewater (e.g., by way of steam stimulation processes used for heavy oil recovery).

Figure 1:
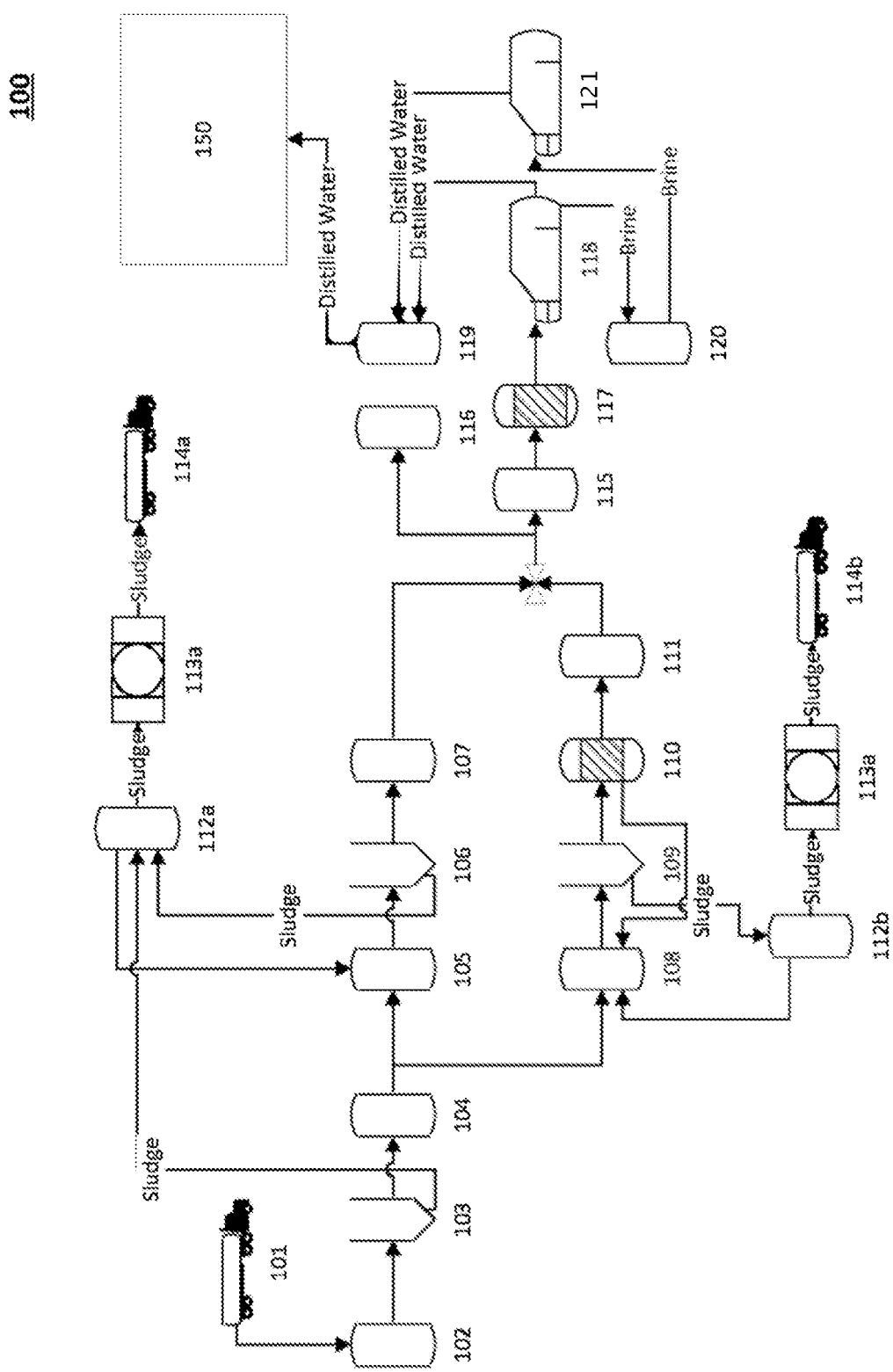
FIG. 1 provides a schematic diagram of a wastewater treatment system in accordance with an exemplary embodiment of the present invention.

FIG. 1 provides a schematic diagram of a wastewater treatment process 100 in accordance with an exemplary embodiment of the present invention. Referring to FIG. 1, many aspects of the depicted process represent conventional processes to arrive at a distilled water treatment product from wastewater from oil or natural gas production. As shown, incoming wastewater is transported from an oil or gas well site and/or associated infrastructure. For example, oil and gas wastewater may include liquid wastes from the drilling, development and/or operation of oil and gas wells and/or collection systems and facilities. In this exemplary process, the wastewater is transported by a tanker 101 and is stored in a receiving water storage tank 102, until it is processed. Alternatively, wastewater may be added to receiving water storage tank 102 directly through a direct pipe connection to the wastewater source.

The wastewater passes through one or more primary settling clarifiers 103 and raw water storage tanks 104 before passing to a first pretreatment train (items 105, 106, and 107) or second pretreatment train (items 108, 109, 110, and 111). In a first pretreatment train, the pH of the waste water is adjusted in a pH adjustment/chemical addition tank 105. Once the pH is adjusted, the wastewater passes to a secondary clarifier 106 before being sent to a final equalization tank 107.

In a second pretreatment train, the wastewater passes from the raw water storage tank 104 to a pH adjustment/chemical adjustment tank 108. Once the pH is adjusted, the wastewater enters one or more secondary lamella clarifiers 109 before passing through a sand filter 110. The treated water is then stored in a final equalization tank 111. Material collected in the filter media of the sand filter 110 may be recycled back to the beginning of the first and/or second pretreatment trains for further processing.

Generally, solids entrained in the wastewater are removed from the wastewater at any of the primary settling clarifiers 103, secondary clarifiers 106, and/or secondary lamella clarifiers 109. The solids are passed to a sludge thickening tank (112a, 112b). The thickened sludge is then passed through a filter press (113a, 113b) before it is transported (114a, 114b) for landfill disposal. The liquid removed from the solids in a sludge thickening tank (112a, 112b) may be recycled to the beginning of the first and/or second pretreatment trains.

Once the wastewater is passed through the first and/or second pretreatment trains described above, it may be referred to as "pretreated water" and is sent to a pretreated water storage tank 115. Alternatively, the pretreated water may be held in a dedicated pretreated water tank 116. Water stored in the pretreated water tank 116 is designated for certain use without further processing by the present inventive process.

The pretreated water that is to be further processed is passed from the pretreated water storage tank 115 to an ultrafiltration (UF) tank 117, where hydrostatic pressure forces the pretreated waste through a semipermeable membrane. Suspended solids and solutes of high molecular weight are retained in the membrane, while water and low molecular weight solutes pass through the membrane.

The pretreated water passes from the UF tank 117 to one or more distiller units 118 such that "distilled water" is produced. In certain embodiments, a distiller unit 118 includes an evaporator, such as but not limited to a NOMAD evaporator. Distilled water produced in the distiller unit 118 is stored in a distilled water tank 119. As described in greater detail below, in connection with FIG. 2, the distilled water is passed to a de-wasting system 150 such that de-wasted water is produced. The de-wasting system 150 includes the innovative processes and systems of the present invention.

As shown, in certain embodiments, a concentrated brine holding tank 120 may be employed along with a mechanical brine crystallization unit 121 to remove sodium chloride from wastewater to produce distilled water. The distilled water produced in the brine crystallization unit 121 is also stored in the distilled water tank 119, and any concentrated brine may be discarded or sold.

The processes described above that result in producing distilled water from wastewater are typical processes used. Alternative processes may be employed to pretreat and distill the wastewater to arrive at an input water product that is further processed by the systems and methods of the present invention. The present invention is not limited to the above-described system and processes.

Although distilled water produced by the above described process may be reused in drilling, development and/or operation of oil and gas wells without further processing, it typically must still be treated as a waste product. Such waste must be stored in impoundments, tanks or containers that meet residual waste requirements prior to future use as makeup water for hydraulic fracturing or other oil and gas well development activities. Accordingly, storage, transport, and reuse of such a material may be burdensome and costly as compared to a non-waste product. Further processing must be done to "de-waste" the water.

As shown in Table 2, below, distilled water produced by processing wastewater through a system similar to the system illustrated in FIG. 1, may not meet each of the criteria for a de-wasted water product, such as the criteria listed in Table 1 which represent de-wasted water criteria for Pennsylvania.

TABLE 2

Summary of Distilled Water Characteristics

|  | Flow (MGD) | pH | Alkalinity (mg/L $CaCO_3$) | TDS (mg/L) | TSS (mg/L) | COD (mg/L) | $CBOD_5$ (mg/L) | Total Nitrogen (mg/L) | Ammonia $NH_3$—N (mg/L) | Nitrite/ Nitrate, $NO_x$—N (mg/L) |
|---|---|---|---|---|---|---|---|---|---|---|
| Average | 0.04 | 10.2 | 139 | 50 | 7 | 1257 | 439 | 47 | 31.9 | 0.25 |
| Min. | 0.002 | 8.1 | 134 | 6 | 5 | 211 | 86 | 26 | 7.3 | 0.25 |
| 5% | 0.006 | 9.7 | 135 | 13 | 5 | 234 | 112 | 30 | 15.2 | 0.25 |
| 25% | 0.015 | 10.0 | 137 | 21 | 5 | 363 | 222 | 37 | 24.6 | 0.25 |
| 50% | 0.035 | 10.2 | 139 | 39 | 5 | 738 | 306 | 46 | 32.8 | 0.25 |
| 75% | 0.051 | 10.4 | 142 | 75 | 6 | 1628 | 552 | 55 | 37.7 | 0.25 |

TABLE 2-continued

Summary of Distilled Water Characteristics

| | Flow (MGD) | pH | Alkalinity (mg/L CaCO$_3$) | TDS (mg/L) | TSS (mg/L) | COD (mg/L) | CBOD$_5$ (mg/L) | Total Nitrogen (mg/L) | Ammonia NH3—N (mg/L) | Nitrite/ Nitrate, NOx—N (mg/L) |
|---|---|---|---|---|---|---|---|---|---|---|
| 95% | 0.095 | 10.6 | 144 | 121 | 14 | 3404 | 958 | 63 | 55.1 | 0.25 |
| Max | 0.119 | 10.7 | 144 | 138 | 31 | 7900 | 1220 | 90 | 59.4 | 0.56 |

As shown in Table 2, the content of organic compounds in the water, as shown by the chemical oxygen demand (COD) value, are of particular importance, as the values in Table 2 greatly exceed the limit for COD shown in Table 1. Organic compound concentrations may be determined by COD and/or biological oxygen demand (BOD) values, which indicates the mass of oxygen consumed per liter of solution. Another important contaminate when evaluating the distilled water against de-wasted water criteria is nitrogen series contaminants, including ammonia (NH$_3$), nitrite, and/or nitrate.

Generally, ammonia, COD, and BOD concentrations in the distilled water produced from pretreating and distilling wastewater from oil and natural gas operations as shown in FIG. 1 may be present at levels similar to domestic sewage. The median ratio of CBOD$_5$ to COD as shown in Table 2 is about 0.5, which may be indicative of a fairly biodegradable wastewater. Moreover, the COD may consist of low molecular weight organics and/or volatile organic compounds, as the organic materials passed through the UF tank 117.

The ammonia and total nitrogen concentrations of the distilled water may also be similar to domestic wastewater. As shown in Table 2, the total nitrogen levels of a distilled water product produced from pretreating and distilling wastewater from oil and natural gas operations may range from about 20% to about 90% higher than ammonia levels. Because the nitrate/nitrite levels are shown to be low (e.g., about 0.25 mg/L), the total nitrogen and ammonia likely represent an organic nitrogen fraction, which may or may not be biodegradable.

Figure 2:
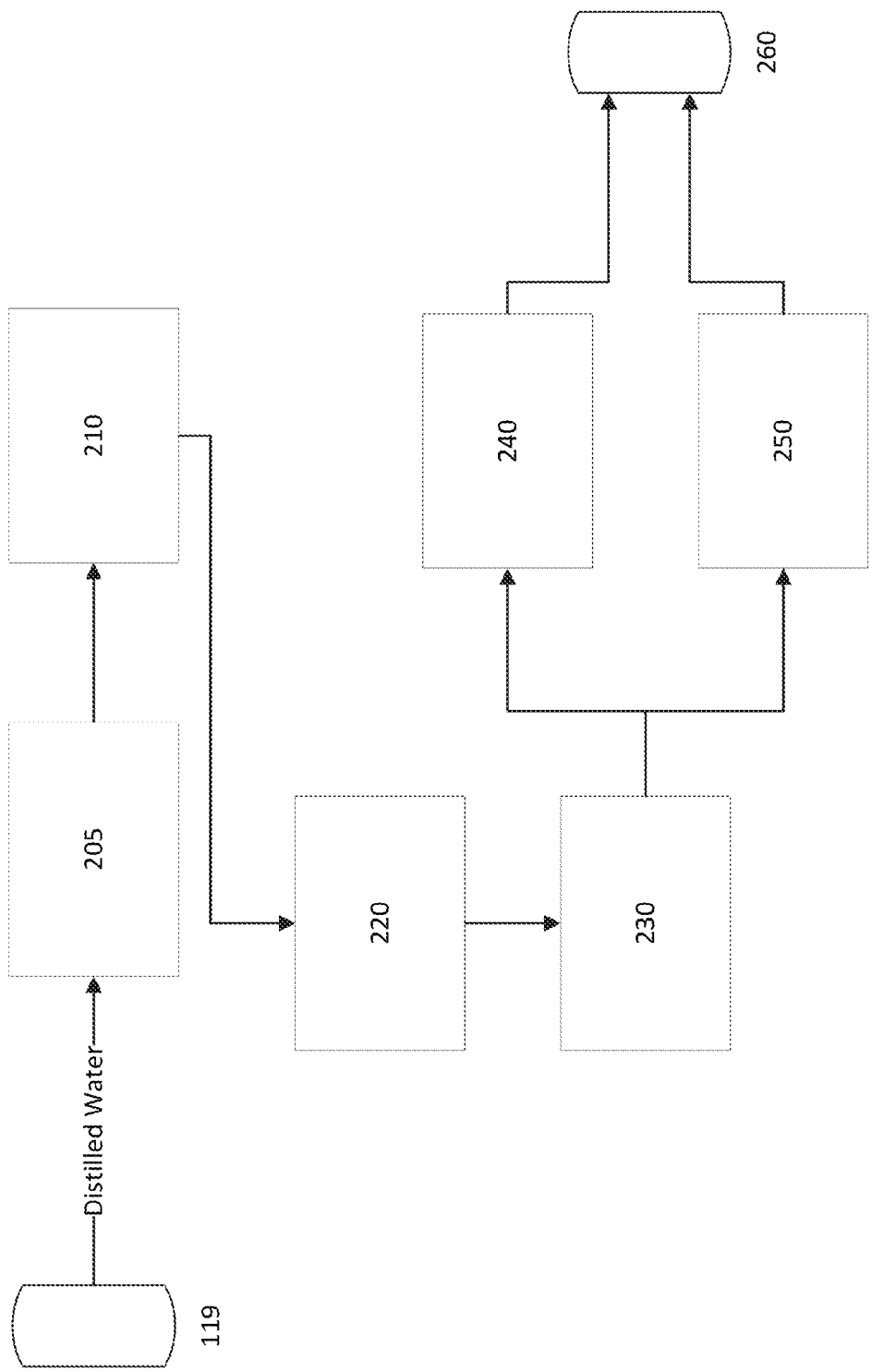
FIG. 2 provides a block diagram of a wastewater treatment system following pretreating and distilling wastewater in accordance with an exemplary embodiment of the present invention.

FIG. 2 provides a block diagram of a wastewater treatment system 150 following pretreating and distilling wastewater in accordance with an exemplary embodiment of the present invention. The illustrated system is capable of producing de-wasted water meeting or exceeding each of the characteristics of a typical regulatory regime for de-wasted water, such as Pennsylvania's WMGR123. Such a system solves many of the problems of de-wasting distilled water, including but not limited to the similar density of oil, mud and water; large fluctuation in daily flow rate; and high concentrations of emulsified oil.

Referring to FIGS. 1 and 2, distilled water, such as water stored in the distilled water tank 119, passes into a temperature control unit 205, such as a heating or cooling system. The temperature of the influent distilled water is preferably between 20° C. to 35° C. for the present invention to adequately treat the water. One or more temperature control units 205 are employed to either heat or cool the water to a temperature within the preferred range. Water temperature instrumentation determines the water temperature of the inlet and outlet water from the temperature control units 205.

Once the temperature of the influent distilled water is within an acceptable range, the water passes through a pre-filter 210, such as but not limited to a basket strainer or the like. The pre-filter 210 removes particles from the water having a size of greater than about 1/20 inch, greater than about 1/16 inch, greater than about 1/8 inch, or greater than about 1/4 inch. Solids collected in the pre-filter 210 (or generated in subsequent processes described below) may be managed in accordance with applicable residual waste regulations.

The distilled water passes from the pre-filter 210 to one or more anoxic and aerobic tanks 220 to remove COD/BOD and nitrogen. Following treatment in the one or more anoxic and aerobic tanks 220, the treated water moves to one or more membrane separation tanks 230. The process of anoxic and aerobic tanks 220 and membrane separation tanks 230 is described in greater detail in connection with FIG. 3, below. Following processing in the anoxic and/or aerobic tanks 220 and membrane separation tanks 230, the processed water stream is further treated in either an ion exchange system 240 or a reverse osmosis system 250. The ion exchange system 240 or a reverse osmosis system 250 are described in greater detail below in connection with FIGS. 4 and 5, respectively.

Figure 3:
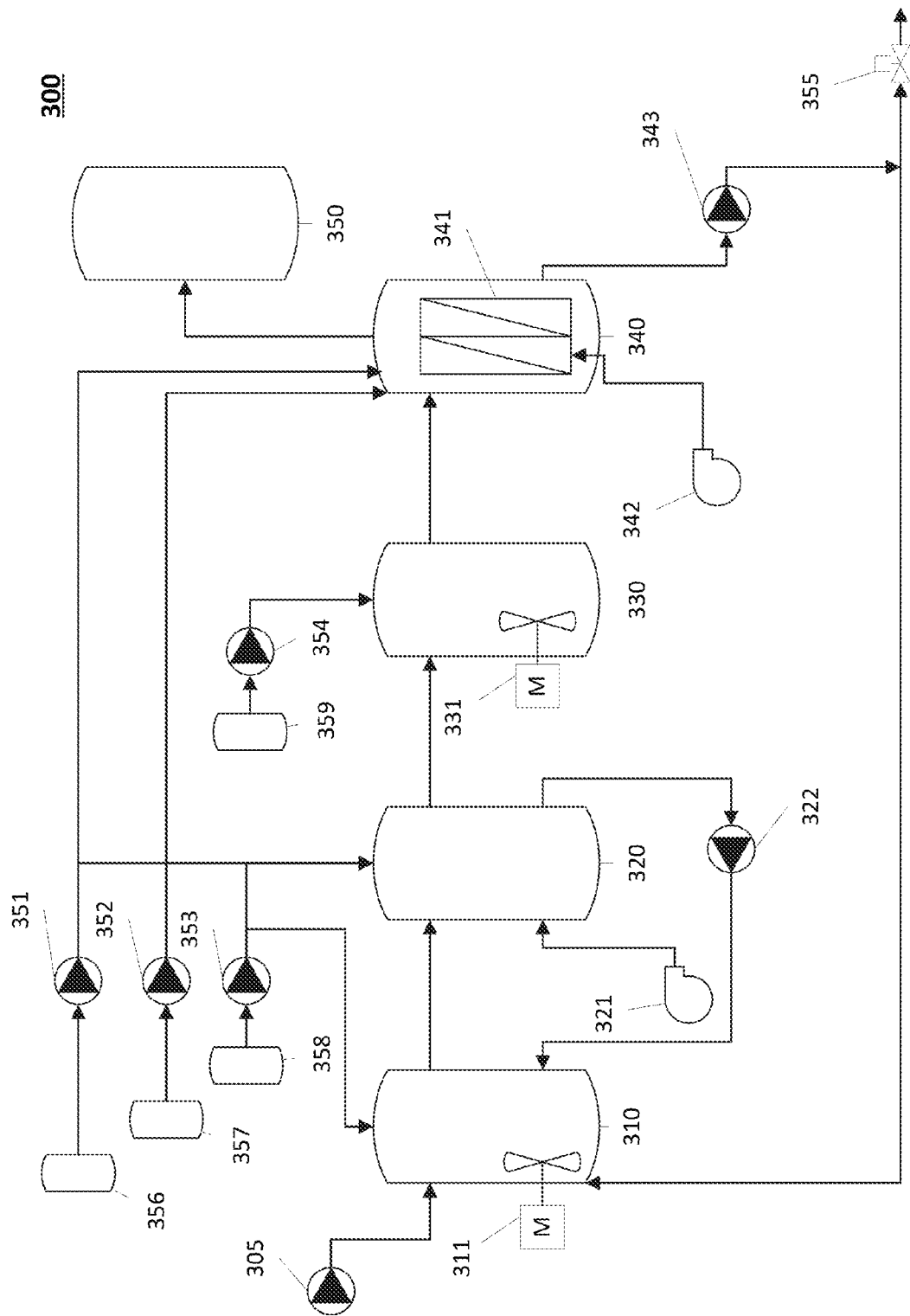
FIG. 3 provides a schematic diagram of a wastewater treatment system including biological treatment and membrane separation in accordance with an exemplary embodiment of the present invention.

FIG. 3 provides a schematic diagram of a wastewater treatment system 300 including biological treatment and membrane separation in accordance with an exemplary embodiment of the present invention. Referring to FIGS. 1, 2, and 3, a liquid water stream, such as the distilled water stored in the distilled water tank 119, enters a pre-anoxic tank 310 from the temperature control unit 205 through pump 305, where a denitrification reaction occurs. Denitrification is a microbial process where nitrate (NO3−) is converted to nitrite (NO2−), which is converted to nitric oxide and nitrous oxide (NO +N2O), which is converted to nitrogen gas (N2). The liquid water stream is added to the tank in a continuous process.

The pre-anoxic tank 310 is "seeded" with biological material that includes bacteria. The bacteria (e.g., heterotrophic bacteria) in the pre-anoxic tank 310 convert any nitrate compounds in the wastewater to nitrogen gas, which is released into the atmosphere. Although denitrification releases nitrogen from the water, oxygen released in the process stays dissolved in the water, which reduces the oxygen input needed for the system in the next step of the process. The source of the biological material is sludge from a sewage processing plant, typically referred to as "activated sludge." Activated sludge includes sludge particles produced in waste treatment by the growth of organisms in aeration tanks, such as in a sewage treatment plant. The sludge is "activated" because the sludge includes living material such as bacteria, fungi, and protozoa. These living material are used in the denitrification reaction. This seed step occurs once, to seed the tank. Then, additional bacteria is grown as part of the COD degradation process. In some cases, all of the bacteria in the system may die. In that case, the system must be re-seeded.

In the embodiment of FIG. 3, the pre-anoxic tank 310 includes a submersible mix pump 311 for mixing the tank contents. Optionally, additives such as but not limited to phosphorous may be added to the pre-anoxic tank 310. Phosphorus is an essential nutrient required for biological treatment which is missing in the wastewater. For example, phosphorus, in the form of phosphoric acid stored in tank 358 is added, through pump 353, as needed to the influent of pre-anoxic tank 310. Typically, a dissolved oxygen level in the anoxic tank may be from about greater than 1.0 mg/L and the temperature in the pre-anoxic tank 310 range from about 20° C. to about 35° C. An industrial scale pre-anoxic tank may be about 10,000 gallons of capacity, without limitation.

The distilled water being processed in process 300 passes from the pre-anoxic tank 310 to an aeration tank 320 such that nitrogen compounds (e.g., $NH_3$, $NO_2$) are nitrified by nitrifying bacteria. Nitrification is the oxidation of ammonia with oxygen into nitrite followed by the oxidation of these nitrites into nitrates by biological mechanisms, such as by bacteria or other micro-organisms. Under aerobic conditions, biological organisms (e.g., ammonia oxidizing bacteria and/or nitrite oxidizing bacteria) added in the pre-anoxic tank 310 and remaining in the water that passes to the aeration tank 320 oxidize nitrogen compounds to nitrite and nitrate compounds.

Oxygen is added to the aeration tank 320, for example by employing compressors and/or diffusers or by high purity oxygen and mechanical surface aeration. As shown in FIG. 3, an air pump 321 delivers air into the aeration tank 320, and a pocket of compressed air forms in the top of the aeration tank 320. As water enters the tank from the pre-anoxic tank 310, it passes through the air pocket. For example, the aeration tank 320 may contain a baffle or other structure, such that water sprays down through the pocket of compressed air. Moreover, water may be further aerated in the tank through a riser or the like (not shown). For example, coarse bubble diffusers may be submerged in the tank liquid and provide air to the aeration tank 320.

An industrial scale version aeration tank 320 may be from about 50,000 to about 75,000 gallons, without limitation. The tank may include a vent system (not shown) to release gasses that form in the tank and to provide for a turnover of air in the tank. The pump 321 and vent may be controlled by the same electrical circuit such that vent may open when the pump 321 is running, and the vent may close when the pump is turned off. Moreover, the pump 321 and vent circuitry may be in electrical communication with a pressure gauge so that they may be automatically operated based on the pressure within the tank. In other embodiments, the pump 321 and vent circuitry may be in communication with a flow switch, which turns the pump/vent system on when water is flowing.

As shown, any number of chemicals may be added to the aeration tank 320. Bacteria macronutrients, such as but not limited to phosphorous, may be added at any point in the anoxic/aerobic biological treatment system. For example, phosphorus, in the form of phosphoric acid stored in tank 358 is added, through pump 353, as needed, to aeration tank 320.

Micronutrients may be added by directing, for example, boiler or cooling tower blow-down to the system along with a source of alkalinity (e.g., NaOH) for pH control, as nitrification consumes alkalinity. The alkalinity source may be KOH, instead of or in addition to NaOH in certain embodiments, due to the very low $Cl^-$ and $Na^+$ limits for de-wasting water in some regulatory regimes, such as the limits shown in Table 1. For example, boiling or cooling tower blow-down from the temperature control unit 205 with added NaOH or KOH is stored in tank 357 and added by pump 353. Typically, antifoam agent addition may be needed to control foaming, depending on the characteristics of the distilled water. Accordingly, an antifoam agent stored in tank 356 may be added to the aeration tank 320 by pump 351.

Nitrate may be recycled to the pre-anoxic tank 310 from the aeration tank 320 through a dedicated recycle pump 322 or the like. In this way, the oxygen requirement of the waste in the pre-anoxic tank 310 is met by the release of oxygen from nitrates in the recycled flow.

The treated distilled water passes from the aeration tank 320 to a post-anoxic tank 330, where residual nitrate (e.g., from about 3 to about 10 mg/L) is removed by microbial action. In some cases, the carbon concentration in the water may be insufficient to support this microbial action. In those cases, carbon is added from dosing the post-anoxic tank 330 with a supplemental carbon source, such as ethanol, which is stored in tank 359 and delivered by pump 354. The use of a supplemental carbon source may not be necessary in all cases. Such a source may be employed due to low BOD/COD levels in the treated water. The amount of added carbon varies with the design influent loading, which can vary from system to system. The amount of carbon in the system should be sufficient to maintain bacterial growth, such as to prevent the bacteria from dying off and requiring the system to be re-seeded.

Denitrification requires a carbon source to take place. Although sufficient carbon may be available in the distilled water entering the pre-anoxic tank 310, the BOD:N ratio of the material entering the post-anoxic tank 330 may be insufficient to allow for adequate denitrification. Accordingly, an external source of carbon (e.g., methanol, ethanol, etc.) may be added to the post-anoxic tank 330 to increase the BOD:N ratio. Such addition may occur by way of a carbon dosing pump or other means. The amount of added carbon must be carefully controlled, as too much added carbon introduces an unacceptable BOD into the effluent, while too little leaves some nitrates under-nitrified. Process measurements, such as flow and COD loading, are taken to determine the amount of carbon to be added.

The post-anoxic tank 330 may include the same or similar properties as the pre-anoxic tank 310. For example, an industrial scale post-anoxic tank may be about 10,000 gallons, without limitation. Moreover, the post-anoxic tank 330 may include a submersible mix pump 331 for mixing of the tank contents.

It has been found that the particular arrangement of the pre-anoxic tank 310, aeration tank 320, and post-anoxic tank 330 is beneficial, as the pre-anoxic tank 310 has the advantage of a higher denitrification rate while the nitrates remaining in the liquor passing out of the pre-anoxic tank 310 can be denitrified further in the post-anoxic tank 330 through endogenous respiration. However, other arrangements of anoxic/aerobic tanks may be employed as desired or required. For example, any number of aeration and anoxic tanks may be employed, and the order of such tanks may be rearranged. In one alternative embodiment, the post-anoxic tank 330 may be omitted. In that embodiment, treated water moves from the aeration tank 320 to the membrane separation system 340 (discussed below).

Membrane separation 230 (e.g., employing a membrane bioreactor or the like) is employed to reduce both BOD/COD and nitrogen from the treated water that passed through the anoxic/aerobic biological treatment tanks 220 (that is, through tanks 310, 320, and 330).

Suspended bacteria and other particulate solids (i.e., mixed liquor) may be removed from the treated water using a membrane separation system 340. There are many different options for a membrane separation system 340 design, but a micro or ultrafiltration membrane bioreactor ("MBR") is preferred to separate solids from treated effluent. Also, most of the COD in the water is removed through microbial action in the MBR 340. An exemplary MBR includes a submerged membrane 341.

In one specific embodiment, the MBR 340 includes a hollow-fiber membrane having fibers held in modular cassettes that are immersed directly into a liquid. Each cassette includes a permeate header that is connected to the suction side of a reversible rotary lob pump, which applies a low pressure vacuum to draw treated effluent through the microscopic pores of the fibers in an outside-in flow path. This approach may minimize energy demands and prevent particles from fouling and plugging inside the membrane fiber. One particular MBR thought to be useful in the processes described herein is a Z-MOD™-L MBR manufactured by GE Water & Process Technologies. The Z-MOD™-L MBR includes a ZEEWEED® 500 membrane.

The MBR 340 includes the membrane cassette 341 and tank internals, membrane air scour blower 342, mixed liquor recycle pump 343, permeate pumps, chemical feed systems, a main control panel, and/or other instrumentation. The system may be scalable such that cassettes may be added or removed as necessary.

The MBR 340 may have bacteria macronutrients, such as but not limited to phosphorous, added thereto. Micronutrients may be added by directing boiler or cooling tower blow-down to the system along with a source of alkalinity for pH control (nitrification consumes alkalinity). Generally, antifoam addition may be needed to control foaming, depending on the characteristics of the distilled water. For example, boiling or cooling tower blow-down from the temperature control unit 205 with added NaOH or KOH is stored in tank 357 and added by pump 353. An antifoam agent stored in tank 356 may be added to the MBR 340 by pump 351.

Different scouring and cleaning systems may also be employed to keep the membranes 341 of the MBR 340 clean depending on the system design. For example, in a submerged membrane design, the membrane may be cleaned using an air scour system 342. In certain embodiments, the MBR 340 may be cleaned in place using caustic and/or citric acid solutions. Accordingly, parallel membrane tanks may be provided such that one tank can be taken offline for cleaning without stopping treatment.

As shown, mixed liquor may be recycled from the membrane tank to the pre-anoxic tank 310 by way of the mixed liquor recycle pump 343. The recycled material may be referred to as return activated sludge (RAS) and may be recycled to the pre-anoxic tank 310 to re-seed the new distilled water entering the anoxic/aeration system. Excess waste activated sludge (WAS) may be removed from the system, such as through valve 355. Treated water passes from the MBR 340 to a storage tank 350. Although a treated water storage tank 350 is shown, this tank may be omitted and the permeate leaving the MBR 340 can be transferred directly to an ion exchange system 240 and/or a reverse osmosis system 250.

Although permeate, or purified water, leaving the membrane separation system 340 may meet the limitations of Table 1, above, in certain situations, additional processing may be required to further purify the water. Referring back to FIG. 2, water leaving membrane separation 340 may be introduced to an ion exchange system 240 and/or a reverse osmosis system 250. These systems may be employed to reliably remove varying concentrations of $NH_3$—N and/or $NO_x$—N.

Figure 4:
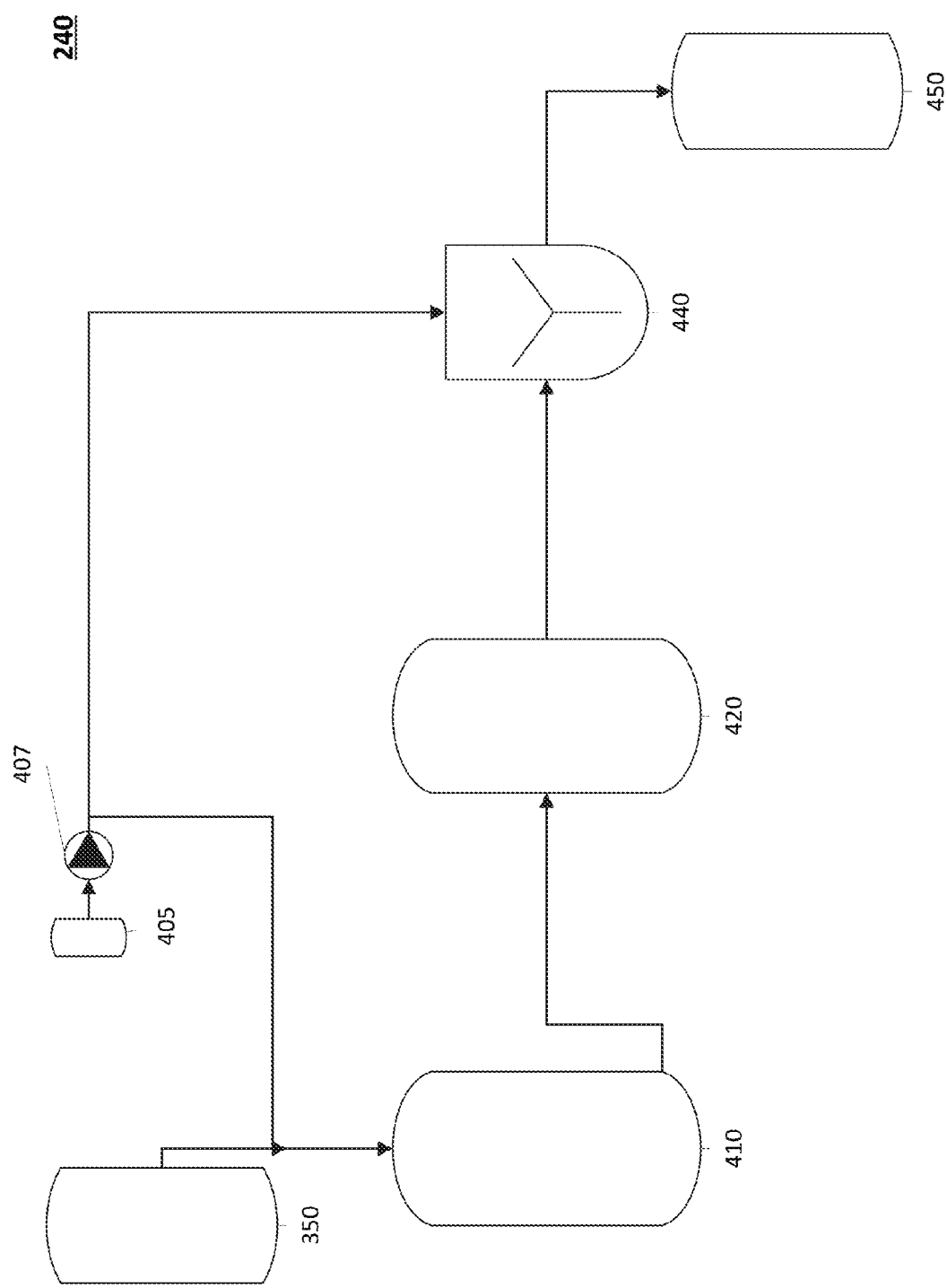
FIG. 4 provides a schematic diagram of a wastewater post-treatment system including ion exchange in accordance with an exemplary embodiment of the present invention.

FIG. 4 provides a schematic diagram of a wastewater post-treatment system 240 including ion exchange in accordance with an exemplary embodiment of the present invention. In certain situations, heterotrophic bacteria may inhibit the growth and activity of nitrifying bacteria to consume ammonia. In this situation, ion exchange offers an alternative or additional method in the removal of ammonia ions. Ion exchange offers a number of advantages to biological treatment alone, including the ability to handle spikes in influent ammonia levels and the ability to operate over a wider range of temperatures.

Referring to FIG. 4, water from the treated water storage tank 350 is introduced to a strong acid (10 percent) cation ("SAC") column 410. Although a treated water storage tank 350 is shown, this tank may be omitted and the permeate leaving the MBR 340 can be transferred directly to the SAC column 410. The pH of water exiting the treated water storage tank 350 be adjusted by adding sodium hydroxide from a tank 405 by a pump 407. The SAC column 410 includes an amount of $H^+$ ions, which may be regenerated by the addition of, for example, $H_2SO_4$ or HCl. In one embodiment, the SAC column may remove $NH_3$—N while reducing the pH of the water to less than about 6.0. The SAC column includes about 50 cubic feet of resin. The lifetime of the resin is about 24 hours before it must be regenerated.

The SAC column 410 is typically operated until breakthough. In one exemplary embodiment, the SAC column 410 is actually two columns arranged in series in a lead/lag configuration. In a lead/lag the primary bed receives the contaminated water. This initial column the contaminant or contaminants of concern, usually to acceptable levels itself. The second column acts as a safeguard against contaminants remaining in the water following break-through of the primary column. Upon break-through, the primary column is regenerated and placed back into service, typically as the secondary column, with the secondary column now becoming the primary column. In an alternative embodiment, the system 240 includes two or more sets of SAC columns 410 that operate in parallel, with each set including a primary and secondary column in a lead/lag configuration. With a parallel arrangement, sets of columns can be taken offline to regenerate without stopping the process.

The water passed from the SAC column 410 to a decarbonator 420 such that $CO_2$ formed in the SAC column 410 may be removed from the water. A decarbonator liberates $CO_2$ from the water to a gaseous state. For example, the decarbonator 420 may be a forced draft decarbonator. In a forced draft decarbonator, water is fed into the top of a packed tower at atmospheric pressure. The tower is typically packed with material with a very high surface contact area, which enhances the transfer of $CO_2$ from the liquid phase to the gas phase. Air is forced up from the bottom of the packed tower in a counter-current flow design. The air becomes saturated with $CO_2$ from contacting the water and is removed at the top of the tower.

Treated water leaving the decarbonator 420 may be pH-neutralized 440 to a pH of from about 6.0 to about 8.0, preferably about 7.0. Neutralization may occur through a tank 405 having a base (e.g., NaOH) and optionally $CO_2$ (not shown) mixed into the water using a mixer 441. The neutralized water is then stored in a storage tank 450 for reuse. The levels of contaminants in the water are such that the stored water is "de-wasted" water, such that it meets certain regulatory limits, such as the Pennsylvania limits provided in Table 1.

Figure 5:
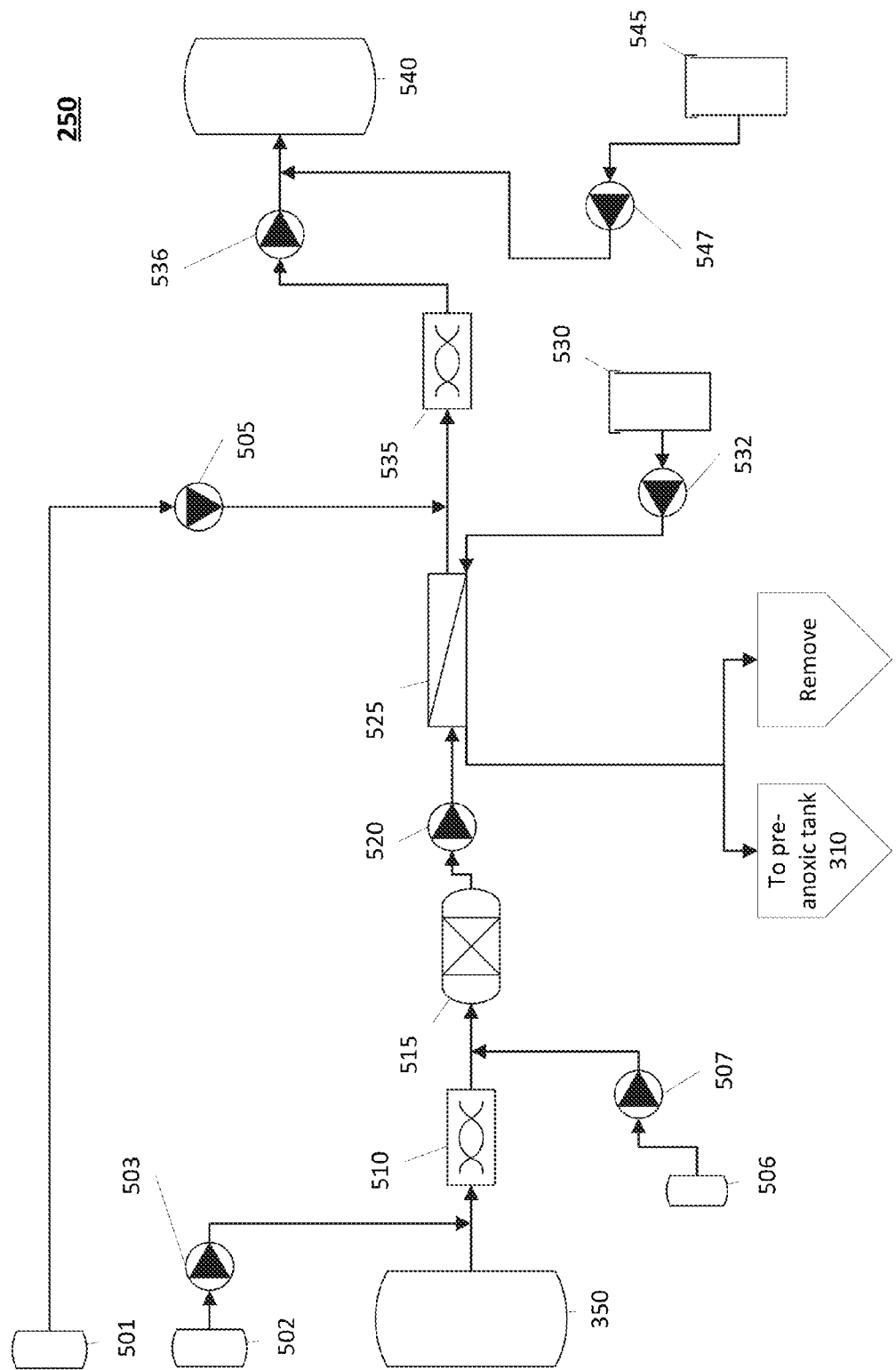
FIG. 5 provides a schematic diagram of a wastewater post-treatment system including reverse osmosis in accordance with an exemplary embodiment of the present invention.

FIG. 5 provides a schematic diagram of a wastewater post-treatment system 250 including reverse osmosis in accordance with an exemplary embodiment of the present invention. Water from the treated water storage tank 350 is introduced into a mixer 510 to adjust the pH of the water. The pH of the water is adjusted to less than about 6.0 by adding, for example, $H_2SO_4$ or HCl stored in tank 502 and added by pump 503 and mixing in mixer 510. The pH adjustment step may be employed when the removal of $NH_3$—N is required to ensure that $NH_3$—N remains as ions and does not enter the gaseous phase.

An anti-scalant additive stored in tank 506 may be added to the pH-adjusted liquid through pump 507, and then liquid passed through a 1 micron pre-RO filter 515. The filtered liquid is then introduced to an reverse osmosis vessel 525 using a high pressure reverse osmosis feed pump 520.

The reverse osmosis vessel 525 forces water from a region of high solute concentration through a semipermeable membrane to a region of low solute concentration by applying a pressure in excess of the osmotic pressure. In certain embodiments, the reverse osmosis membrane(s) employed include a dense layer in the polymer matrix (e.g., skin of an asymmetric membrane or an interfacially polymerized layer within a thin-film-composite membrane). The membrane may be designed to allow only water to pass through the dense layer, while preventing the passage of solutes. In one embodiment, the reverse osmosis includes a "sacrificial" member to increase recovery.

The reverse osmosis vessel 525 includes a number of modular "plug and play" reverse osmosis skids having any number of thin-film composite reverse osmosis membranes. The system includes one or more trains having multiple membranes that may be added or removed based on the amount of water to be processed. In one specific example, thirty-six (36) reverse osmosis membranes may be employed.

The reverse osmosis vessel 525 include a clean-in-place (CIP) system 530. The CIP system circulates cleaning liquids in a cleaning circuit through the reverse osmosis system. In certain embodiments the CIP system 530 may be skid-mounted. Through this cleaning process, trapped contaminants are removed from the reverse osmosis vessel 525 membranes.

The trapped materials removed from the reverse osmosis vessel 525 membranes may be recycled from the reverse osmosis vessel 525 to the anoxic/aerobic system 220 (see FIG. 2). Specifically, the trapped materials removed from the reverse osmosis system 525 membranes may be used to re-seed the pre-anoxic tank 310 or removed from the system as waste or returned to the head of the pretreatment system (see FIG. 1).

Upon exiting the reverse osmosis vessel 525, the water may require pH elevation to ensure the pH is from about 6.0 to about 8.0, preferably about 7.0. To that end, the water may be passed through a pH adjustment system, which may include a metering pump 505 controlled by a downstream pH probe and an inline flash mixer 535. A base, such as but not limited to NaOH, may be added to the water from tank 501 and mixed with the mixer 535.

The processed water may also require re-mineralization to prevent corrosion of downstream pipes, tanks, trucks, etc. As shown, brine from a brine tank 545 may be pumped using pump 547 and mixed into the water. The re-mineralized water is then stored in, for example, a pure water storage tank 540 before being shipped to an end user.

Either the ion exchange system 240 or the reverse osmosis system 250 may be used to further treat the treated water that exits the MBR 340. The decision as to which system to employ may depend on economic factors rather than technical factors.

Referring back to FIG. 2, effluent water exiting the ion exchange system 240b or reverse osmosis system 250 may meet or exceed each of the required properties shown in Table 1, above. Accordingly, distilled water having the properties of Table 2 may be passed through the illustrated processing steps to be transformed into de-wasted water. In certain embodiments, the de-wasted water resulting from the above described treatment process may not be considered a waste as defined in 25 Pa. Code §287.1. Moreover, the de-wasted water may be reused at oil and gas well sites such that a "closed loop" is created. In other embodiments, the de-wasted water may be used in any number of other applications or may simply be discarded into the environment or otherwise handled as fresh water.

Distilled water having up to about 600 mg/L $cBOD_5$ may be processed using the methods described herein. The $cBOD_5$ level may be reduce to less than about 10 mg/L, less than about 5 mg/L, less than about 2.5 mg/L, or even less than about 1 mg/L. Distilled water having influent COD levels of less than about 8000 mg/L may be treated using the methods described herein. Such COD levels may be reduced to less than about 20 mg/L, less than about 15 mg/L, less than about 10 mg/L, or even less than about 5 mg/L in de-wasted water. In some embodiments, the COD levels of a de-wasted water may be reduced by from about 95% to about 99% or greater as compared to COD levels of influent distilled water.

In some embodiments, distilled water having influent $NH_3$—N levels of up to about 50 mg/L may be treated using the methods described herein. Such $NH_3$—N levels may be reduce to less than about 2.0 mg/L, less than 1.5 mg/L, less than 1.0 mg/L, or even less than about 0.5 mg/L. Similarly, the treatment methods may provide de-wasted water having effluent $NO_x$—N levels of less than about 2.0 mg/L, less than about 1.5 mg/L, less than 1.0 mg/L, or even less than about 0.5 mg/L from distilled water having an influent $NO_x$—N level of up to about 0.6 mg/L.

The TSS levels of an exemplary de-wasted water produced subjected to the described treatment methods may be from about 0.1 mg/L to less than about 5 mg/L. In an exemplary embodiment, the TSS levels of a de-wasted water may be from about 0.5 mg/L to less about 2 mg/L, and more particularly less than about 1 mg/L. Such results may be obtained by processing distilled water having an influent TSS level of up to about 15 mg/L, e.g., 10 mg/L or 5 mg/L.

In one exemplary embodiment, the system may be designed to handle maximum flows and 75 percentile $cBOD_5$ and nitrogen concentrations, as shown in Table 2. Higher influent loadings may be managed through equalization or diversion to a sewer. For example, the system may be designed to process up to about 300,000 gallons per day of distilled water having a pH from about 8 to about 11. Exemplary systems are compatible with distilled water having up to about 40 mg/L $NH_3$—N and up to about 60 mg/L total nitrogen at a temperature of from about 20 to about 40° C.

Table 3, below, shows the influent parameters supported by an exemplary system according to the invention:

TABLE 3

Exemplary Influent Design Parameters for Biological System

| Influent Parameters | Average | Maximum | Design Basis |
|---|---|---|---|
| Flow Rate (gpd) | 126,000 | 201,600 | 126,000 |
| COD (mg/L) | 750 | 1,250 | 2000 |
| COD (lb/day) | 788 | 2101 | 2101 |
| Total Nitrogen (mg/L) | 70 | 75 | 120 |
| Total Nitrogen (lb/d) | 74 | 126 | 126 |
| Total Phosphorus (mg/L) | <1 | <1 | <1 |
| TSS (mg/L) | 5 | 10 | 10 |
| Alkalinity (mg/L) | 260 | 260 | 260 |
| pH | | 8-11 | |
| Temperature | | 20-35° C. | |

Table 4, below, shows design parameters of an exemplary system according to the invention:

TABLE 4

Exemplary Design Parameters for Biological System

| Design Parameters | Average | Max | Design Basis |
|---|---|---|---|
| Anoxic Tank (gal) | 15000 | 15000 | 15000 |
| Aerobic Tank 1 (gal) | 50000 | 50000 | 50000 |
| Aerobic Tank 2 (gal) | 50000 | 50000 | 50000 |
| Membrane Tanks (gal) | 12230 | 12230 | 12230 |
| HRT (h) | 24.2 | 15.1 | 24.2 |
| Mixed Liquor Temp. (° C.) | 20-34 | 20-34 | 20-34 |
| Mixed Liquor Suspended Solids in Aerobic Tank (mg/L) | 8000 | 10000 | 10000 |
| Mixed Liquor Volatile Suspended Solids in Aerobic Tank (mg/L) | 7420 | 9699 | 9810 |
| Solids Retention Time (SRT) (d) | 46.6 | 15.2 | 15.2 |
| RAS Flow From Membrane Tank (Q) | 4.0 | 4.0 | 4.0 |
| Sludge Wasting (gpd) (the excess growth that needs to be removed from the system) | 1730 @ 1% | 5350 @1.25% | 5300 @ 1.25% |
| Sludge Wasting/Influent Flow | 1.4% | 2.7% | 4.2% |
| Diffusers | Coarse Bubble | Coarse Bubble | Coarse Bubble |
| Max Process Air Flow (scfm) (for aeration tank) | 700 | 1490 | 1500 |

Although any known methods may be employed to determine whether the resultant de-wasted water meets the limitations of Table 1, in one embodiment, such a determination is made according to one or more of the following:
  (a) A minimum of 14 consecutive daily flow proportional composite samples analyzed for strontium, barium and TDS;
  (b) A minimum of 2 weekly flow proportional composite samples which are taken a minimum of 7 days apart analyzed for all constituents listed in Table 1 except ammonia, benzene, methanol, and toluene; and
  (c) A minimum of 2 grab samples taken a minimum of 7 days apart analyzed ammonia, benzene, methanol, and toluene.

Moreover, once a de-wasted water is stored, it may be tested to determine whether it continues to meet the limitations of Table 1, by:
  (a) Collecting daily flow proportional composite samples and analyzing them for strontium, barium and TDS;
  (b) Collecting weekly flow proportional composite samples and analyzing them for all constituents listed in Table 1 except ammonia, benzene, methanol and toluene.
  (c) Collecting weekly grab samples and analyzing them for ammonia, benzene, methanol and toluene.

Of course modifications of the above testing methods may be implemented if desired or required.

Analytical methodologies used to determine whether a de-wasted water meets the requirements of Table 1 may include, but are not limited to, those in the Environmental Protection Agency's ("EPA") "Test Methods for Evaluating Solid Waste, Physical/Chemical Methods" (EPA SW-846), "Methods for Chemical Analysis of Water and Wastes" (EPA 600/4-79-020), "Standard Methods for Examination of Water and Liquid Waste" (prepared and published jointly by the American Public Health Association, American Water Works Association, and Water Pollution Control Federation), the Pennsylvania Department of Environmental Protection's "Sampling Manual for Pollutant Limits, Pathogens and Vector Attraction Reductions in Sewage Sludge" or any comparable method subsequently approved by the EPA or Department of Environmental Protection. Each of these documents is incorporated herein by reference in its entirety.

EXAMPLES

Figure 6:
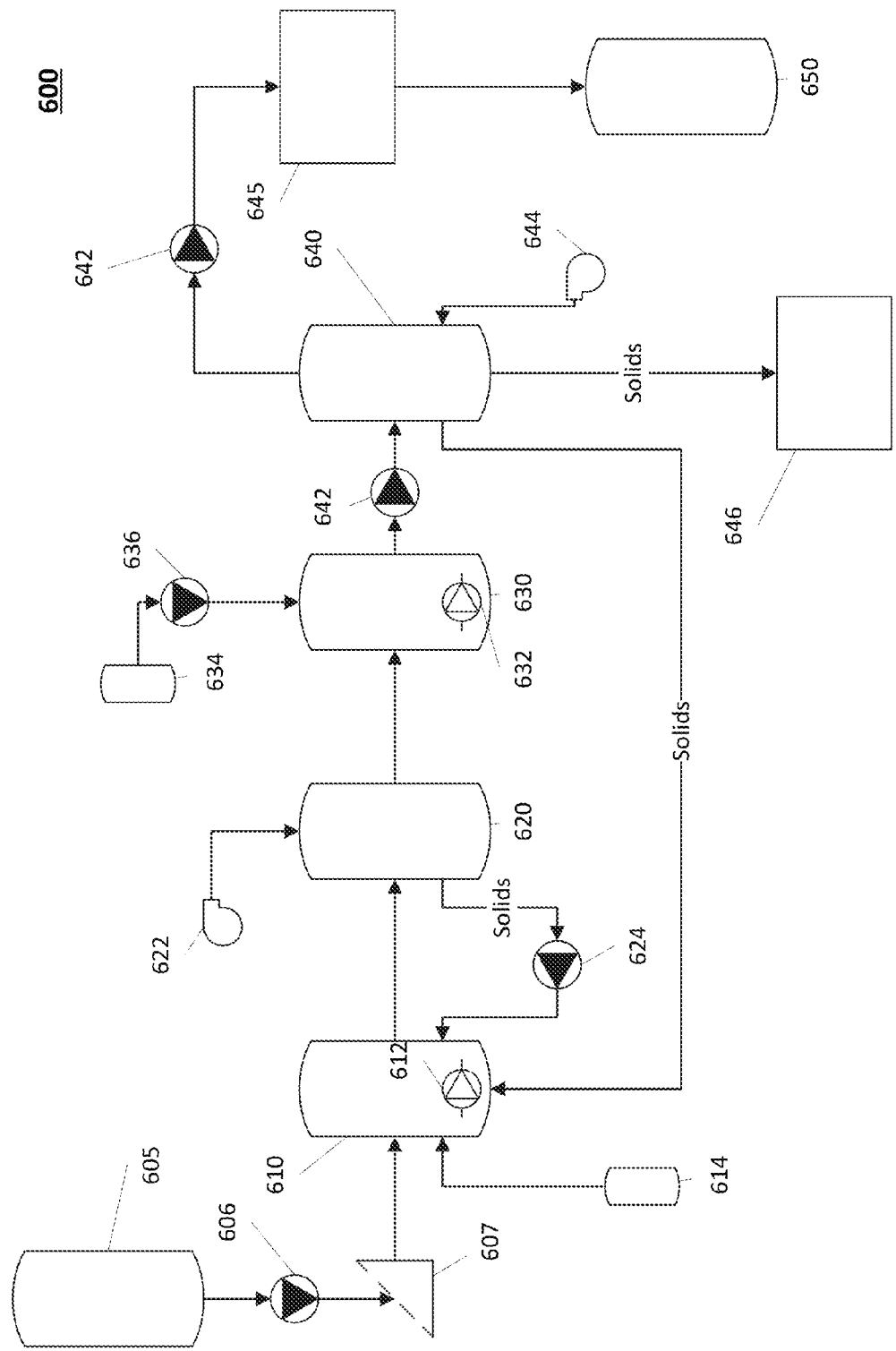
FIG. 6 provides a schematic diagram of a wastewater treatment system in accordance with an exemplary embodiment of the present invention.

An exemplary pilot-sized distilled water processing system was tested with an oil and gas liquid waste distillate. A schematic of the pilot sized plant 600 is illustrated in FIG. 6. As shown, the pilot plant included a 64 gallon pre-anoxic tank 610, a 210 gallon aeration tank 620, a 65 gallon post-anoxic tank 630, a 90 gallon MBR 640, and an ion exchange system 645. The total volume of the pilot system was about 420 gallons. Distilled water from tank 605 is pumped through strainer 607 (<one-eighth inch mesh) to the pre-anoxic tank 610. The pre-anoxic tank 610 includes a submersible pump 612 to mix the tank. Phosphorus, as phosphoric acid, is added from tank 614 to the pre-anoxic tank 610.

Treated water passed from the pre-anoxic tank 610 to the aeration tank 620. Air is added to the aeration tank 620 using aeration blower 622. Nitrates are recycled from the aeration tank to the pre-anoxic tank 610 by the nitrate recycle pump 624.

Treated water then passes to the post-anoxic tank 630. Carbon is added using a carbon source from tank 634 through carbon dosing pump 636. The post-anoxic tank 630 includes a submersible pump 632 to mix the tank contents. A recycle pump 642 transferred the treated water into the membrane tank 640. Air from an aeration blower 644 is used to scour the membranes.

Permeate is sent from the membrane tank 640 through an ion exchange system 645 and into an effluent container 650. Pump 642 removes the permeate from the membrane tank 640. Solids are removed to a batch WAS container 646 or gravity feed back to the pre-anoxic tank 610.

Figure 7:
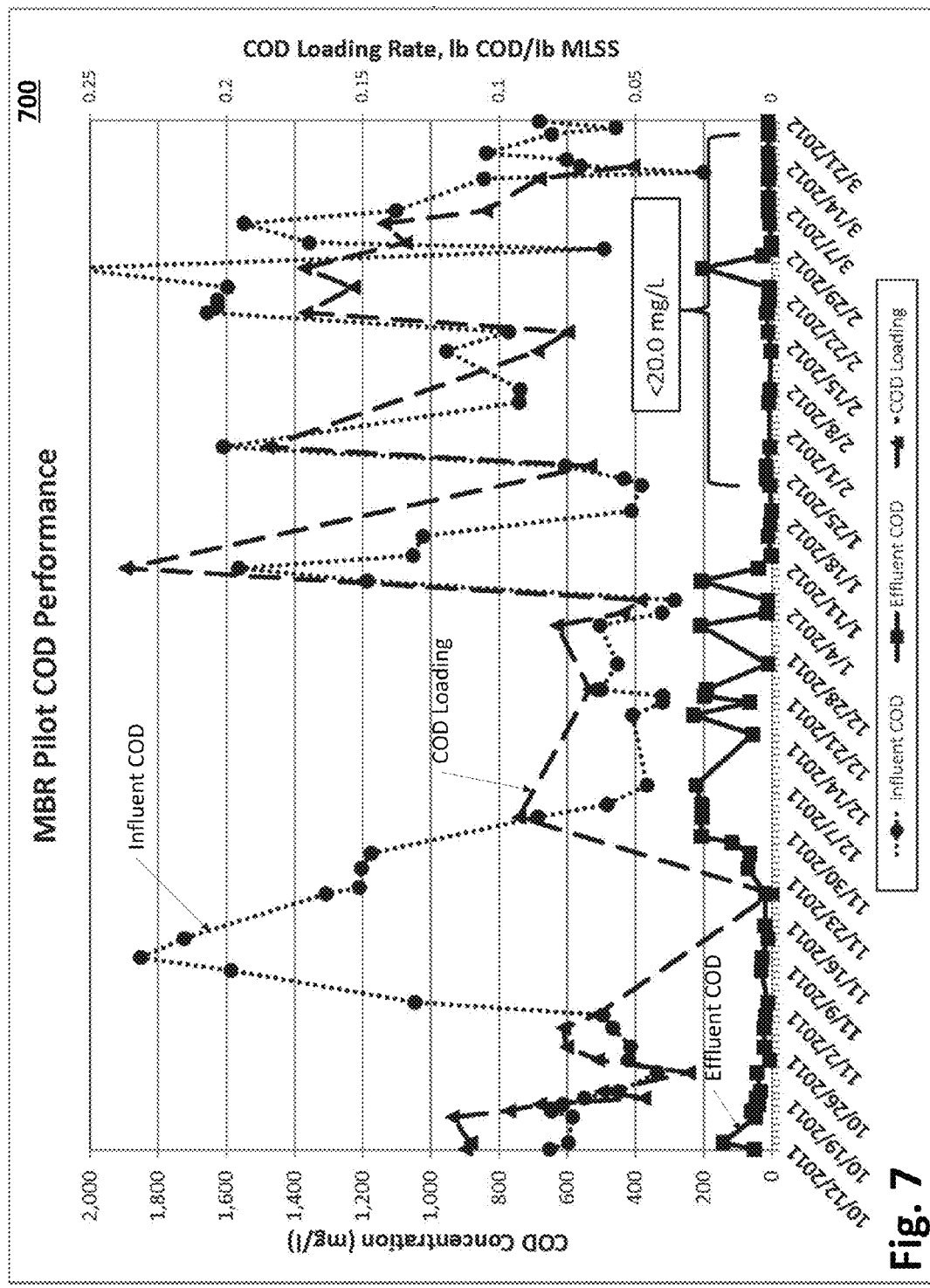
FIG. 7 depicts a graph illustrating the chemical oxygen demand values for the influent, effluent, and loading for an operation of a pilot plant in accordance with the wastewater treatment process depicted in FIG. 6 and employing ion exchange.
Figure 8:
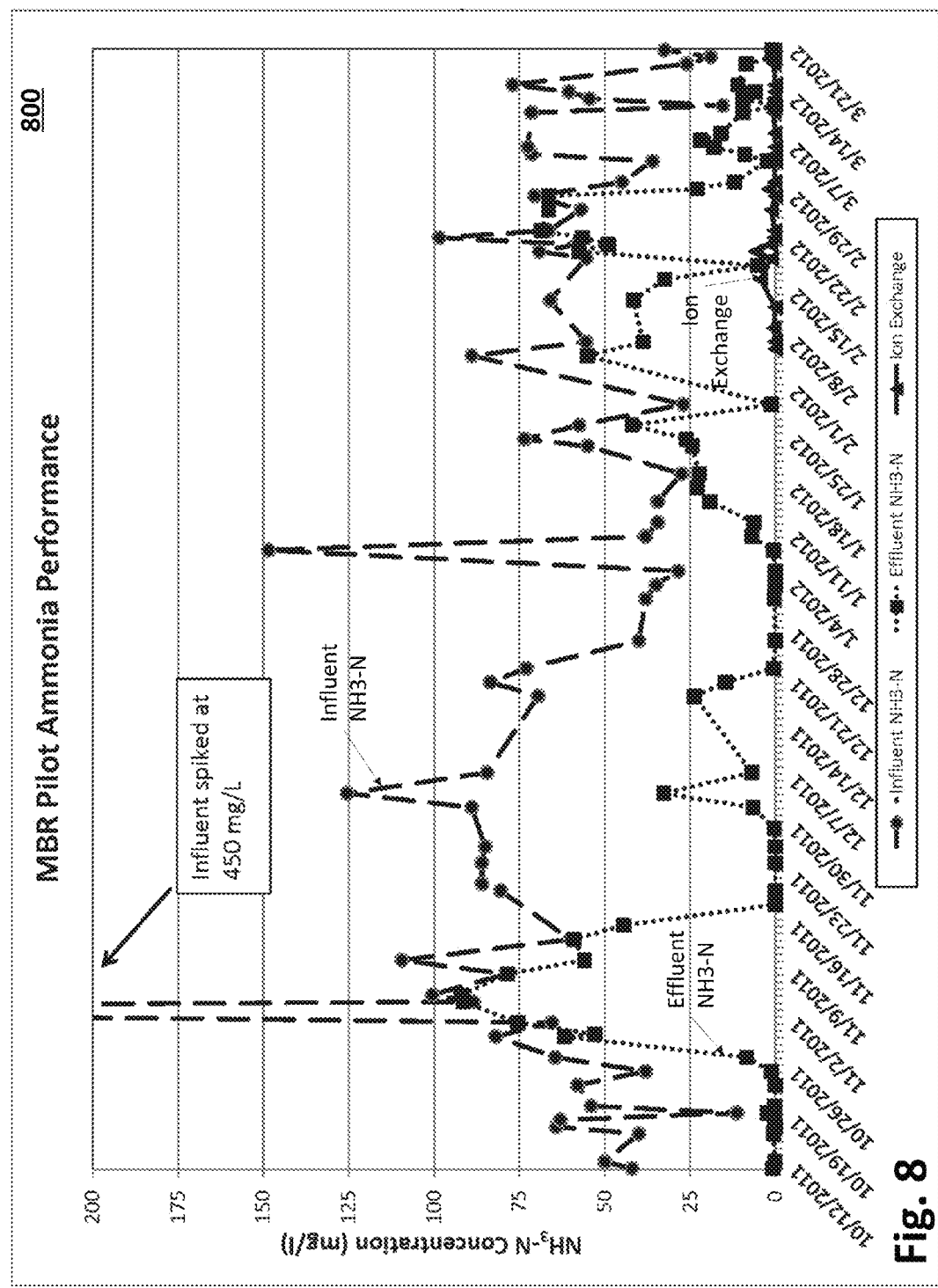
FIG. 8 depicts a graph illustrating the ammonia values for the influent and effluent for an operation of a pilot plant in accordance with the wastewater treatment process depicted in FIG. 6.
Figure 9:
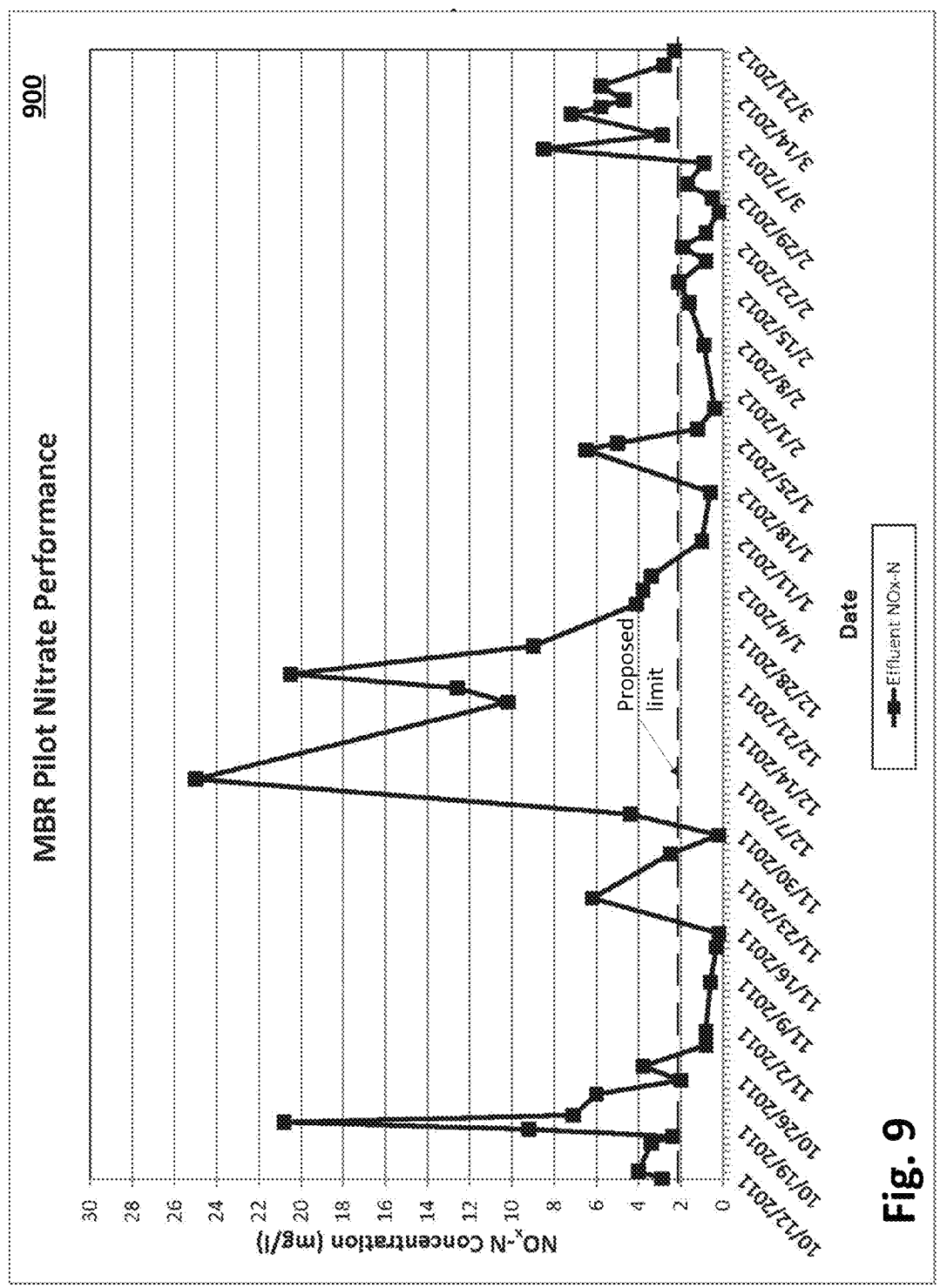
FIG. 9 depicts a graph illustrating the nitrate values for the effluent for an operation of a pilot plant in accordance with the wastewater treatment process depicted in FIG. 6.

A seed sludge was obtained from a municipal sewage plant and screened to less than 3 mm before adding to the pre-anoxic tank 610 of the pilot plant. The pilot system was then operated with influent distilled water falling within the parameters shown in Table 2 above for approximately 2 months for the bacteria in the process to acclimate to the specific wastewater characteristics and reach "steady state." The pilot system was run multiple times from October 2011 to at least Mar. of 2012, and the performance of the system is shown graphically in FIGS. 7-9. FIG. 7 depicts a graph 700 illustrating the chemical oxygen demand values for the influent, effluent, and loading for an operation of a pilot plant 600 in accordance with the wastewater treatment process depicted in FIG. 6 and employing ion exchange. FIG. 8 depicts a graph 800 illustrating the ammonia values for the influent and effluent for an operation of a pilot plant 600 in accordance with the wastewater treatment process depicted in FIG. 6. FIG. 9 depicts a graph 900 illustrating the nitrate values for the effluent for an operation of a pilot plant 600 in accordance with the wastewater treatment process depicted in FIG. 6.

Referring to FIG. 7, the COD concentration of the influent water entering the pilot system and the effluent water exiting the pilot system are shown. Upon the addition of an ion exchange system to the pilot plant, the COD concentration of the effluent water was found to be consistently less than about 20 mg/L.

Referring to FIG. 8, the $NH_3$—N concentration of the influent water entering the pilot system and the effluent water exiting the pilot system are shown. Upon the addition of an ion exchange system to the pilot plant, the $NH_3$—N concentration of the effluent water was found to be consistently less than about 2.0 mg/L.

Referring to FIG. 9, the $NO_3$—N concentration of the influent water entering the pilot system and the effluent water exiting the pilot system are shown. Upon the addition of an ion exchange system to the pilot plant, the $NO_3$—N concentration of the effluent water was found to be consistently less than about 2.0 mg/L.

Figure 10:
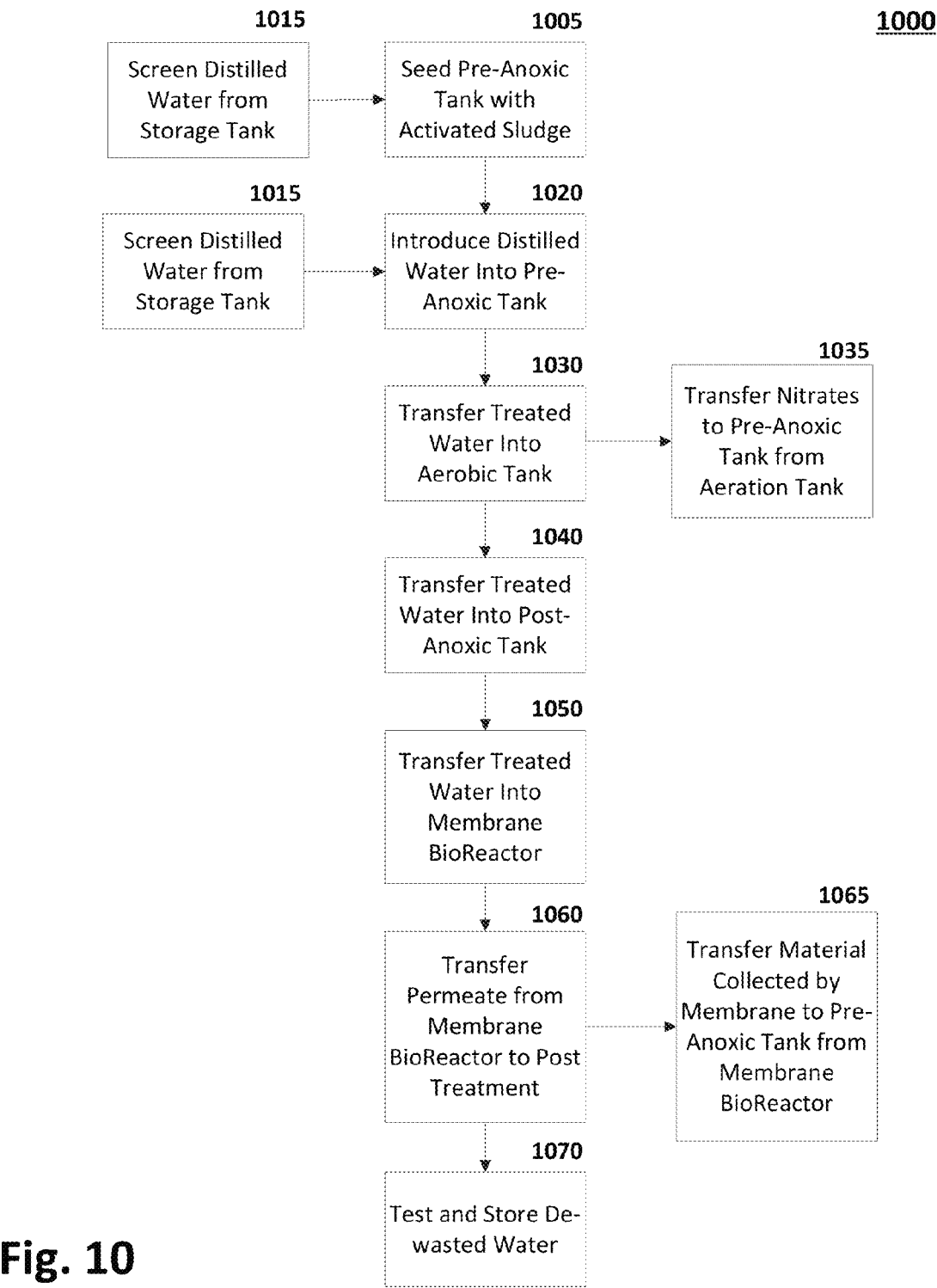
FIG. 10 presents a process flow diagram for a wastewater treatment process in accordance with an exemplary embodiment of the present invention.

FIG. 10 presents a process flow diagram for a wastewater treatment process 1000 in accordance with an exemplary embodiment of the present invention. Referring to FIGS. 1, 2, 3, 4, 5, and 10, at step 1005, the pre-anoxic tank, such as pre-anoxic tank 310, is seeded with activated sludge. This sludge includes bacteria and other micro-organisms that remove nitrogen from a waste stream through microbial action.

At step 1010, a distilled water product enters a temperature control system, such as temperature control system 205, where the temperature of the distilled water product is adjusted to between 20° C. to 35° C. The distilled water product may be the result of pretreating and distilling wastewater from oil and natural gas production. In some cases, the temperature of the water will need to be increase to satisfy the temperature range of between 20° C. to 35° C. In most cases, the temperature will need to be lowered. In still some cases, the temperature of the distilled water product will be within the desired temperature range without adjustment.

At step 1015, the distilled water product is pre-filtered, or screened, to remove solids from the distilled water. Such as by pre-filter system 210. The screen mesh size ranges from a mesh size capable of removing particles of at least 1/20 inch in size to a mesh size capable of removing particles greater than about 1/4 inch in size.

At step 1020, the distilled water product is introduced into the pre-anoxic tank. Once in the tank, microbes contained in the tank digest nitrogen-containing compounds in a denitrification process under anaerobic conditions. Phosphorus, such as in the form of phosphoric acid, may be added to the pre-anoxic tank to provide nutrients for the micro-organisms. Nitrogen gas is released out of the pre-anoxic tank.

At step 1030, the water treated in the pre-anoxic tank is transferred to an aeration tank, such as aeration tank 320, where nitrogen compounds are nitrified by bacteria under aerobic conditions. Air is provided to the tank to facilitate the microbial action. Nitrates from the aeration tank are recycled to the pre-anoxic tank.

At step 1040, the water treated in the aeration tank is transferred to a post-anoxic tank, such as post-anoxic tank 330, to remove residual nitrate by denitrification. If necessary, additional carbon is added to facilitate the nitrate removal process. Micro-organisms in the water perform the denitrification under anaerobic conditions.

At step 1050, the water treated in the post-anoxic tank is transferred to a membrane separator, such as membrane bioreactor 340. At this step, microbial action continues on the input side of the membrane. The treated water is forced through the membrane, removing the micro-organisms and other solids from the treated water. The permeate—the purified water that has passed through the membrane—is collected for further treatment.

At step 1060, the permeate from the membrane bioreactor is further treated in a reverse osmosis system or an ion exchange system.

At step 1065, the membrane of the membrane bioreactor is scoured by air to remove the trapped materials, which may be recycled into the pre-anoxic tank as a source of activated sludge.

At step 1070, the water treated in the reverse osmosis system or ion exchange system is collected and tested to demonstrate compliance with de-wasted water criteria. The water, once demonstrated to be de-wasted water, may be reused.

It is understood by those skilled in the art that the drawings are diagrammatic and that further items of equipment such as reflux drums, pumps, vacuum pumps, temperature sensors, pressure sensors, pressure relief valves, control valves, flow controllers, level controllers, holding tanks, storage tanks, and the like may be required in a commercial plant.

We claim:

1. A method for preparing de-wasted water from oil and/or natural gas production wastewater comprising the steps of:
   receiving wastewater from oil and/or natural gas production;
   pretreating the wastewater to produce a pretreated water, said pretreating comprising passing the wastewater through a pretreatment train that comprises a pH adjustment/chemical addition tank, a clarifier, and an equalization tank;
   distilling the pretreated wastewater to produce a distilled water comprising contaminates including nitrogen compounds, said distilling comprising:
      introducing the pretreated water to a crystallization unit to produce distilled water and a brine therefrom;
   purifying the distilled water to produce a purified water, said purifying comprising:
      passing the distilled water produced by the crystallization unit through a temperature control unit to adjust the temperature of the distilled water to between 20° C. to 35° C;
      adding the distilled water to a pre-anoxic tank comprising micro-organisms;
      denitrifying the nitrogen compounds in the added distilled water in the pre-anoxic tank,
         wherein the denitrification is performed by the micro-organisms under anoxic conditions;
      transferring the distilled water from the pre-anoxic tank to an aeration tank,
         wherein additional nitrogen compounds in the distilled water are nitrified under aerobic conditions by the micro-organisms; and
      transferring the distilled water from the aeration tank to a membrane bioreactor comprising a membrane to remove a portion of the contaminants and micro-organisms from the distilled water to arrive at a purified water from the membrane bioreactor; and converting the purified water into a de-wasted water that meets or exceeds each de-wasted water criterion of General Permit WMGR123 (Pennsylvania Department of Environmental Protection, 2012), said converting comprising:
passing the purified water through a reverse osmosis pre-filter; and
introducing the purified water to a reverse osmosis system comprising a plurality of semipermeable, thin-film composite reverse osmosis membranes.

2. The method of claim 1, further comprising introducing the purified water from the membrane bioreactor to an ion exchange system.

3. The method of claim 1, further comprising the step of pre-filtering the distilled water prior to adding the distilled water to the pre-anoxic tank to remove a portion of contaminants comprising suspended solids from the distilled water.

4. The method of claim 1 wherein phosphorus is added to the pre-anoxic tank to facilitate the denitrification of the nitrogen compounds in the distilled water added to the pre-anoxic tank.

5. The method of claim 1 further comprising the step of recycling nitrates from the aeration tank to the pre-anoxic tank, wherein the nitrates are formed during the denitrification of the additional nitrogen compounds.

6. The method of claim 1 wherein contaminants and micro-organisms are trapped in the membrane and further wherein the trapped contaminants and micro-organisms are collected and added to the pre-anoxic tank.

7. The method of claim 1, wherein the purified water comprises a Nitrite level at or below 2 mg/L.

8. A system for preparing de-wasted water from oil and/or natural gas production wastewater comprising:
a pretreatment train for producing a pretreated water from received wastewater, the pretreatment train comprising a pH adjustment/chemical addition tank, a clarifier, and an equalization tank;
a distillation train for producing a distilled water from the pretreated water, the distillation train comprising:
a crystallization unit in fluid communication with the pretreatment train, the crystallization unit adapted to receive the pretreated water and to produce distilled water and a brine therefrom;
a distilled water tank in fluid communication with the crystallization unit, the distilled water tank adapted to store the distilled water from the crystallization unit;
a purifying train for producing a purified water from the distilled water, the purifying train comprising:
a pre-anoxic tank in fluid communication with the distilled water tank and operable to receive distilled water from the distilled water tank, wherein the pre-anoxic tank comprises activated sludge comprising micro-organisms;
an aeration tank in fluid communication with the pre-anoxic tank and operable to receive distilled water treated in the pre-anoxic tank; and
a membrane bioreactor comprising a membrane, in fluid communication with the aeration tank and operable to receive distilled water treated in the aeration tank,
wherein the distilled water comprises contaminants including nitrogen compounds and the nitrogen compounds are denitrified in the pre-anoxic tank and nitrified in the aeration tank; and
wherein the membrane removes a portion of the contaminants and micro-organisms from the distilled water to arrive at a purified water from the membrane bioreactor; and
a post-treatment system in fluid communication with the membrane bioreactor and adapted to receive the purified water therefrom, the post-treatment system adapted to convert the purified water to a de-wasted water that meets or exceeds each de-wasted water criterion of General Permit WMGR123 (Pennsylvania Department of Environmental Protection, 2012), the post-treatment system comprising:
a reverse osmosis pre-filter; and
a reverse osmosis system comprising a plurality of semipermeable, thin-film composite reverse osmosis membranes.

9. The system of claim 8, wherein the post-treatment system further comprises an ion exchange system.

10. The system of claim 8 further comprising a temperature controller operable to adjust the temperature of the distilled water received by the pre-anoxic tank to the range of between 20° C. to 35° C. prior to adding the distilled water to the pre-anoxic tank.

11. The system of claim 8 further comprising a pre-filtering module operable to filter the distilled water received by the pre-anoxic tank prior to adding the distilled water to the pre-anoxic tank to remove a portion of contaminants comprising suspended solids from the distilled water.

12. The system of claim 8 further comprising a phosphorus source operable to add phosphorus to the pre-anoxic tank to facilitate the denitrification of the nitrogen compounds in the distilled water added to the pre-anoxic tank.

13. The system of claim 8 further comprising nitrate recycle pump operable to transfer nitrates from the aeration tank to the pre-anoxic tank, wherein the nitrates are formed during the denitrification of the additional nitrogen compounds.

14. The system of claim 8 wherein the membrane bioreactor further comprises a membrane scouring system to remove contaminants and micro-organisms trapped in the membrane.

15. The system of claim 14 further comprising a pump for returning the removed contaminants and micro-organisms to the pre-anoxic tank.

16. The system of claim 8 further comprising an antifoam agent source configured to introduce an antifoaming agent into the aeration tank.

17. The system of claim 8 further comprising an alkalinity source configured to introduce alkalinity agents to adjust the pH in the pre-anoxic tank.

* * * * *